US011835937B2

(12) United States Patent
Ishikuro

(10) Patent No.: US 11,835,937 B2
(45) Date of Patent: Dec. 5, 2023

(54) NON-TRANSITORY COMPUTER READABLE MEDIUM STORING DATA DISTRIBUTION PROGRAM, SERVER APPARATUS, TERMINAL APPARATUS, AND DATA DISTRIBUTION SYSTEM

(71) Applicant: Mitsubishi Electric Corporation, Tokyo (JP)

(72) Inventor: Toru Ishikuro, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/039,966

(22) PCT Filed: May 12, 2021

(86) PCT No.: PCT/JP2021/018062
§ 371 (c)(1),
(2) Date: Jun. 2, 2023

(87) PCT Pub. No.: WO2022/239150
PCT Pub. Date: Nov. 17, 2022

(65) Prior Publication Data
US 2023/0350379 A1 Nov. 2, 2023

(51) Int. Cl.
*G05B 19/40* (2006.01)
*G06F 8/71* (2018.01)
*G05B 19/4093* (2006.01)

(52) U.S. Cl.
CPC ......... *G05B 19/40938* (2013.01); *G06F 8/71* (2013.01); *G05B 2219/31418* (2013.01)

(58) Field of Classification Search
CPC .... G05B 19/40938; G05B 2219/31418; G06F 8/71

(Continued)

(56) References Cited

U.S. PATENT DOCUMENTS 6,167,563 A * 12/2000 Fontana ................ G06F 8/71
707/999.103
7,082,457 B1 * 7/2006 Burianek ............. G06Q 10/10
709/224

(Continued)

FOREIGN PATENT DOCUMENTS

JP 2003-005991 A 1/2003
JP 2006-018359 A 1/2006

(Continued)

OTHER PUBLICATIONS

International Search Report and Written Opinion dated Aug. 3, 2021, received for PCT Application PCT/JP2021/018062, filed on May 12, 2021, 10 pages including English Translation.

(Continued)

*Primary Examiner* — Michael J Brown
(74) *Attorney, Agent, or Firm* — XSENSUS LLP

(57) ABSTRACT

A data distribution program causes a server apparatus to execute a process of distributing project data to a terminal apparatus that writes the project data to a device among a plurality of devices included in an apparatus. The data distribution program causes the server apparatus to execute: receiving a distribution request for the project data from the terminal apparatus; identifying a related device that is another device constituting one apparatus together with the device to which the project data designated in the distribution request is written; identifying the related device that requires update of project data based on a version of the project data designated in the distribution request and a version of the project data written in the related device; and transmitting, to the terminal apparatus, the project data designated in the distribution request and the project data to be written to the related device identified.

10 Claims, 10 Drawing Sheets

FIG.2

(58) Field of Classification Search
USPC .......................................................... 700/179
See application file for complete search history.

(56) References Cited

U.S. PATENT DOCUMENTS

| | | | |
|---|---|---|---|
| 11,308,447 B2 * | 4/2022 | Stump | .............. G06Q 10/06375 |
| 2016/0357547 A1 | 12/2016 | Menjo et al. | |
| 2017/0169091 A1 * | 6/2017 | Kapadia | ................. G06F 16/273 |
| 2018/0019934 A1 * | 1/2018 | Abadi | .................. G06F 11/1662 |
| 2019/0102160 A1 | 4/2019 | Shogaki et al. | |

FOREIGN PATENT DOCUMENTS

| | | | |
|---|---|---|---|
| JP | 2016-051198 A | 4/2016 |
| JP | 2017-187888 A | 10/2017 |
| JP | 2018-180722 A | 11/2018 |
| JP | 2019-020798 A | 2/2019 |
| JP | 2019-067264 A | 4/2019 |
| WO | 2015/083243 A1 | 6/2015 |
| WO | 2016/166799 A1 | 10/2016 |

OTHER PUBLICATIONS

Notice of Reasons for Refusal dated Dec. 7, 2021, received for JP Application 2021-557859, 7 pages including English Translation.
Matsumoto, et al., "Motion controller engineering environment MT Developer2", Mitsubishi Electric Technical Report, Apr. 25, 2007, vol. 81, No. 4, pp. 29-32 (19 pages including Partial English Translation).
Decision to Grant dated Apr. 5, 2022, received for JP Application 2021-557859, 5 pages including English Translation.

* cited by examiner

FIG.3

| PROJECT ID | PROJECT VERSION | IMPORTANCE | REQUIRED VERSION OF TOOL |
|---|---|---|---|
| 1001 | 3 | HIGH (ESSENTIAL) | 1.2 |
| 1001 | 2 | LOW (OPTIONAL) | 1.1 |
| 1001 | 1 | LOW (OPTIONAL) | 1.1 |

FIG.5

| PROJECT ID | PROJECT VERSION | RELATED PROJECT(#1) :ID | RELATED PROJECT(#1) :REQUEST VERSION | RELATED PROJECT(#2) :ID | RELATED PROJECT(#2) :REQUEST VERSION |
|---|---|---|---|---|---|
| 1001 | 3 | 1002 | 2 | 1003 | 2 |

FIG.8

| PROJECT ID | USER ID |
|---|---|
| 1001 | 1151, 1152, 1153··· |
| 1002 | 1151, 1152, 1153··· |
| 1003 | 1151, 1152, 1153··· |
| ... | ... |

FIG.9

| USER ID | MAIL ADDRESS |
|---|---|
| 1151 | 1151@aaa.com |
| 1152 | 1152@aaa.com |
| 1153 | 1153@aaa.com |
| ... | ... |

| CUS-TOMER ID | DEVICE ID | APPARA-TUS ID | PROJECT ID | VERSION OF PROJECT DATA IN USE |
|---|---|---|---|---|
| 1151 | A | α | 1001 | 2 |
| 1151 | B | α | 1002 | 2 |
| 1151 | C | α | 1003 | 1 |
| 1151 | D | β | 1004 | 1 |
| 1151 | E | β | 1005 | 2 |
| 1151 | F | γ | 1006 | 1 |
| 1151 | G | γ | 1007 | 3 |
| ... | ... | ... | ... | ... |

| PROJECT ID | PROJECT VERSION | IMPORTANCE | REQUIRED VERSION OF TOOL |
|---|---|---|---|
| 1001 | 3 | HIGH (ESSENTIAL) | 1.2 |
| 1001 | 2 | LOW (OPTIONAL) | 1.1 |
| 1001 | 1 | LOW (OPTIONAL) | 1.1 |

NON-TRANSITORY COMPUTER READABLE MEDIUM STORING DATA DISTRIBUTION PROGRAM, SERVER APPARATUS, TERMINAL APPARATUS, AND DATA DISTRIBUTION SYSTEM

CROSS-REFERENCE TO RELATED APPLICATION

The present application is based on PCT filing PCT/JP2021/018062, filed May 12, 2021, the entire contents of which are incorporated herein by reference.

FIELD

The present disclosure relates to a non-transitory computer readable medium storing a data distribution program that is executed by a server apparatus that distributes data to a tool for writing data to a factory automation (FA) device, and to a server apparatus, a terminal apparatus, and a data distribution system.

BACKGROUND

In the factory automation (hereinafter may be referred to as FA) industry, it is common practice that an assembly manufacturer (hereinafter may be referred to as AM) designs and manufactures an apparatus, an end user (hereinafter may be referred to as EU) purchases and operates the apparatus, and the AM performs maintenance support.

In many cases, as part of the maintenance support, malfunction correction or function addition is performed on the apparatus after the delivery of the apparatus. FA devices are configured by hardware that is necessary for implementing a required function, and project data describing operation commands for the hardware. When the AM performs the maintenance support, the AM performs correcting the project data. The creation and correction of the project data requires a dedicated tool adapted to the data. This tool is also called the engineering tool. The engineering tool is also required for writing the created or edited project data to the hardware that executes the project data.

FA devices may execute processing in cooperation with other FA devices to operate as one apparatus that achieves a desired function. That is, one apparatus may include a plurality of FA devices.

Conventionally, project data of a plurality of FA devices included in one apparatus are managed using the following methods. One method is that the AM stores the created project data in an in-house file server using a different folder for each update of the data. This method enables the AM to collectively manage the project data related to one apparatus, and to operate the apparatus without a problem by collectively writing the project data to the hardware.

Another method, which has been developed in recent years, is to store project data for each apparatus on a cloud system. In many cases in which such a cloud system is used, every time project data is registered in the system, all past data are also stored so that the past data can be freely accessed when necessary. These systems can be utilized to replace the conventional practice for dealing with a change. Namely, in the conventional practice, an AM operator visits the EU factory and transfers project data to FA devices no matter how small the change is. On other hand, in these systems, the AM operator can ask the EU to update the data if the EU is allowed access to the cloud system.

Patent Literature 1 describes a method of storing, on a cloud, data of a monitoring system for a large-scale apparatus group such as a plant, detecting an update on the apparatus side when the data on the cloud is updated, and performing data synchronization, and a method of restoring past data.

CITATION LIST

Patent Literature

Patent Literature 1: Japanese Patent Application Laid-open No. 2018-180722

SUMMARY

Technical Problem

Among a plurality of FA devices included in one apparatus, control programs described in the project data for operating the FA devices have a close relationship with each other, and even one change may need to be reflected in the project data of other FA devices, depending on what the change is. In this case, update of only the project data of a specific FA device or incomplete update can cause an inconsistency between the operations executed by the respective FA devices, making the operation of the whole apparatus unstable.

The present disclosure has been made in view of the above, and an object thereof is to obtain a data distribution program capable of preventing the operation of an apparatus implemented as a combination of a plurality of devices from becoming unstable due to the update of project data of the devices.

Solution to Problem

In order to solve the above problem and achieve the object, the present disclosure is a data distribution program for causing a server apparatus to execute a process of distributing project data to a terminal apparatus that writes the project data to a device among a plurality of devices included in an apparatus, the data distribution program causing the server apparatus to execute process procedures including: a first step of receiving a distribution request for the project data from the terminal apparatus; a second step of identifying a related device that is another device constituting one apparatus together with the device to which the project data designated in the distribution request is written; a third step of identifying the related device that requires update of project data based on a version of the project data designated in the distribution request and a version of the project data written in the related device; and a fourth step of transmitting, to the terminal apparatus, the project data designated in the distribution request and the project data to be written to the related device identified in the third step.

Advantageous Effects of Invention

A data distribution program according to the present disclosure can achieve the effect of preventing the operation of an apparatus implemented as a combination of a plurality of devices from becoming unstable due to the update of project data of the devices.

BRIEF DESCRIPTION OF DRAWINGS

FIG. 3 is a diagram illustrating an example of the version, importance, and required version of the engineering tool for project data handled by the data distribution system.

FIG. 5 is a diagram for explaining the operation of the request version designation unit.

FIG. 8 is a diagram illustrating an example of a correspondence list of project IDs and user IDs.

FIG. 9 is a diagram illustrating an example of a correspondence list of user IDs and mail addresses of notification target users.

DESCRIPTION OF EMBODIMENTS

Hereinafter, a non-transitory computer readable medium storing a data distribution program, a server apparatus, a terminal apparatus, and a data distribution system according to an embodiment of the present disclosure will be described in detail with reference to the drawings.

Embodiment

Figure 1:
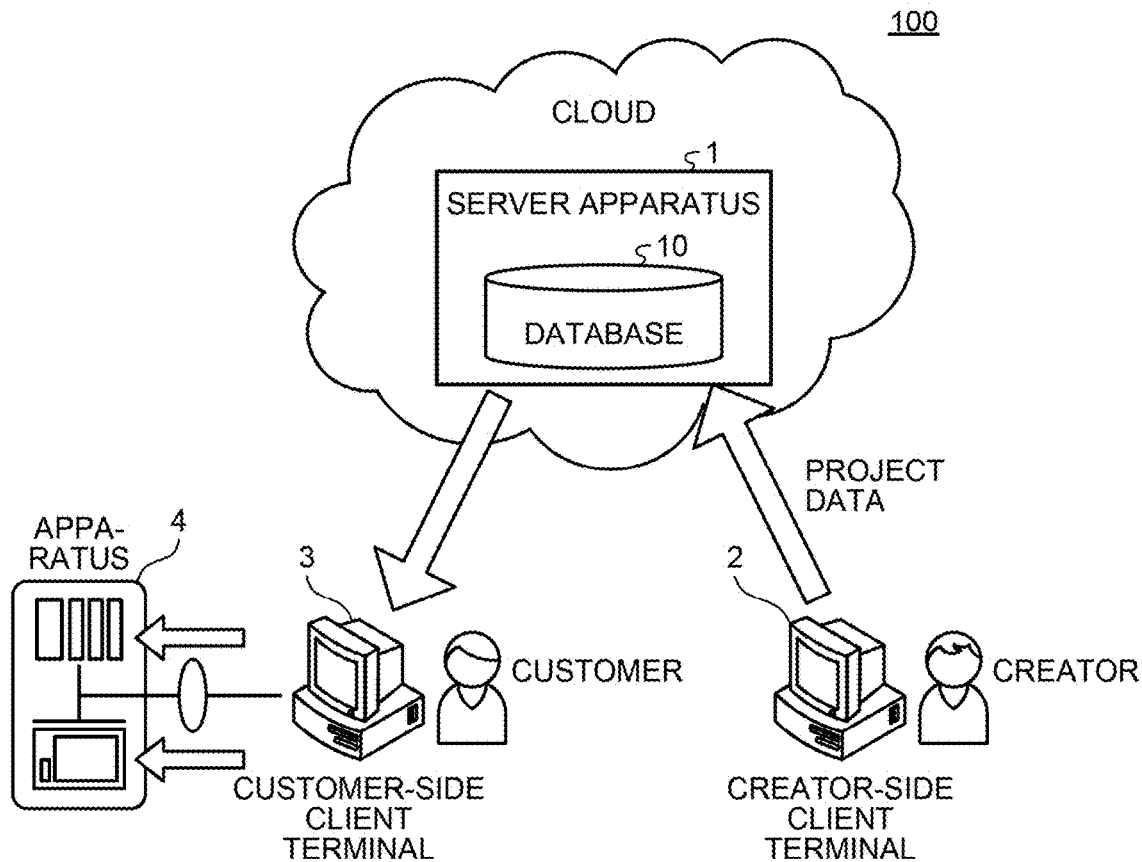
FIG. 1 is a diagram illustrating an exemplary configuration of a data distribution system according to an embodiment.

FIG. 1 is a diagram illustrating an exemplary configuration of a data distribution system 100 according to an embodiment. The data distribution system 100 includes a server apparatus 1 provided in a cloud, a creator-side client terminal 2, and a customer-side client terminal 3. The customer-side client terminal 3 is connected to an apparatus 4 that is used in a production system to which factory automation (FA) is applied. The customer-side client terminal 3 may be configured to allow a plurality of apparatuses 4 to be simultaneously connected thereto. Note that a plurality of creator-side client terminals 2 may be provided. Similarly, a plurality of customer-side client terminals 3 may be provided. The server apparatus 1 may include a plurality of apparatuses that have similar functions and cooperate with each other to form one server apparatus.

Figure 2:
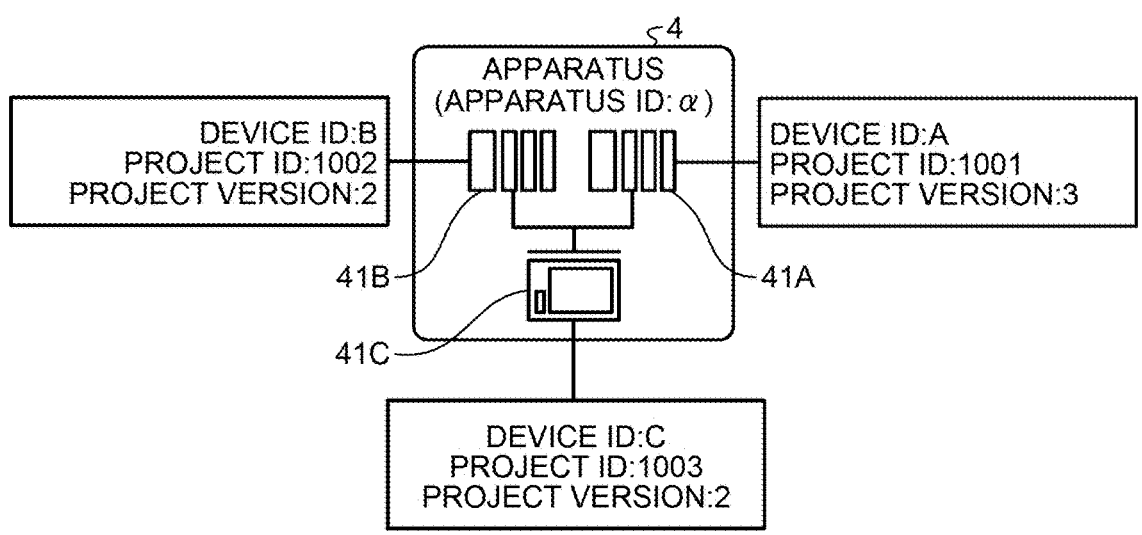
FIG. 2 is a diagram for explaining an exemplary configuration of an apparatus connected to a customer-side client terminal.

The apparatus 4 connected to the customer-side client terminal 3 includes a plurality of FA devices having different functions. FIG. 2 is a diagram for explaining an exemplary configuration of the apparatus 4 connected to the customer-side client terminal 3. In the example illustrated in FIG. 2, the apparatus 4 has the apparatus identifier (ID) a as apparatus identification information, and includes FA devices 41A, 41B, and 41C. Different pieces of project data are written in the FA devices 41A to 41C. In the FA device 41A having the device ID "A" as FA device identification information, project data with the project ID "1001" is written, and the version (project version) of the project data is "3". In the FA device 41B having the device ID "B", project data with the project ID "1002" is written, and the version of the project data is "2". In the FA device 41C having the device ID "C", project data with the project ID "1003" is written, and the version of the project data is "2". Note that in the following description, the project data written in an FA device may be referred to as the project data of an FA device in order to avoid complexity.

The functions of the apparatus 4 are implemented by the FA devices 41A to 41C operating in cooperation. Therefore, there is a certain relationship between the project data of the FA devices 41A to 41C of the apparatus 4, such as synchronization of processes that the FA devices 41A to 41C execute, or performing data transmission and reception among the FA devices 41A to 41C.

Returning to FIG. 1, the server apparatus 1 includes a database 10 in which project data for operating each FA device constituting the apparatus 4 and information related to the project data are registered.

The creator-side client terminal 2 is a terminal apparatus that is used for the creation work and correction work of the project data to be registered in the database 10. The creation and correction of the project data is performed by an operator using an engineering tool. After the creation work or correction work of the project data is completed, the creator-side client terminal 2 uploads the obtained project data to the server apparatus 1. In this case, the creator-side client terminal 2 also uploads information related to the project data. The information related to the project data is, for example, the importance of the project data, the version (hereinafter referred to as the required version) of the engineering tool to be used in the work of writing the project data to the FA device 41, and the like. Note that in the following description, information related to project data may be referred to as project-related information. As illustrated in FIG. 3, a user of the creator-side client terminal 2 can designate the importance of project data and the required version of the engineering tool for the same type of project data (project data with project ID=1001 in the illustrated example) each time the project version is changed through editing. The designation of the importance and the required version can be skipped. If the user skips the designation of the importance, the creator-side client terminal 2 sets a predetermined default importance. If the user skips the designation of the required version, the creator-side client terminal 2 sets a predetermined default required version.

The customer-side client terminal 3 downloads the project data corresponding to an FA device constituting the apparatus 4 from the database 10 of the server apparatus 1, and writes the downloaded project data to the FA device. In this case, if it is necessary to update the project data of two or more FA devices together, the customer-side client terminal 3 downloads all the project data that need to be updated together, and writes each piece of project data to the corresponding FA device. For example, suppose that one of the FA devices constituting the apparatus 4 operates in accordance with a certain version of project data. In this case, if another FA device needs to operate in accordance with a specific version of project data in order to ensure the normal operation of the apparatus 4, the customer-side client terminal 3 downloads all the project data required for ensuring the normal operation of the apparatus 4, and writes each piece of project data to the corresponding FA device. Here, some FA device may have already had the project data required for ensuring the normal operation of the apparatus 4, in which case it is not necessary to download and write the required project data to the FA device.

The customer-side client terminal 3 conducts the writing of project data to an FA device using an engineering tool. When writing the project data to the FA device, the customer-side client terminal 3 confirms whether it is necessary to update the engineering tool to be used. In response to confirming that it is necessary to update the engineering tool, the customer-side client terminal 3 first updates the engineering tool, and then writes the project data to the FA device.

Figure 4:
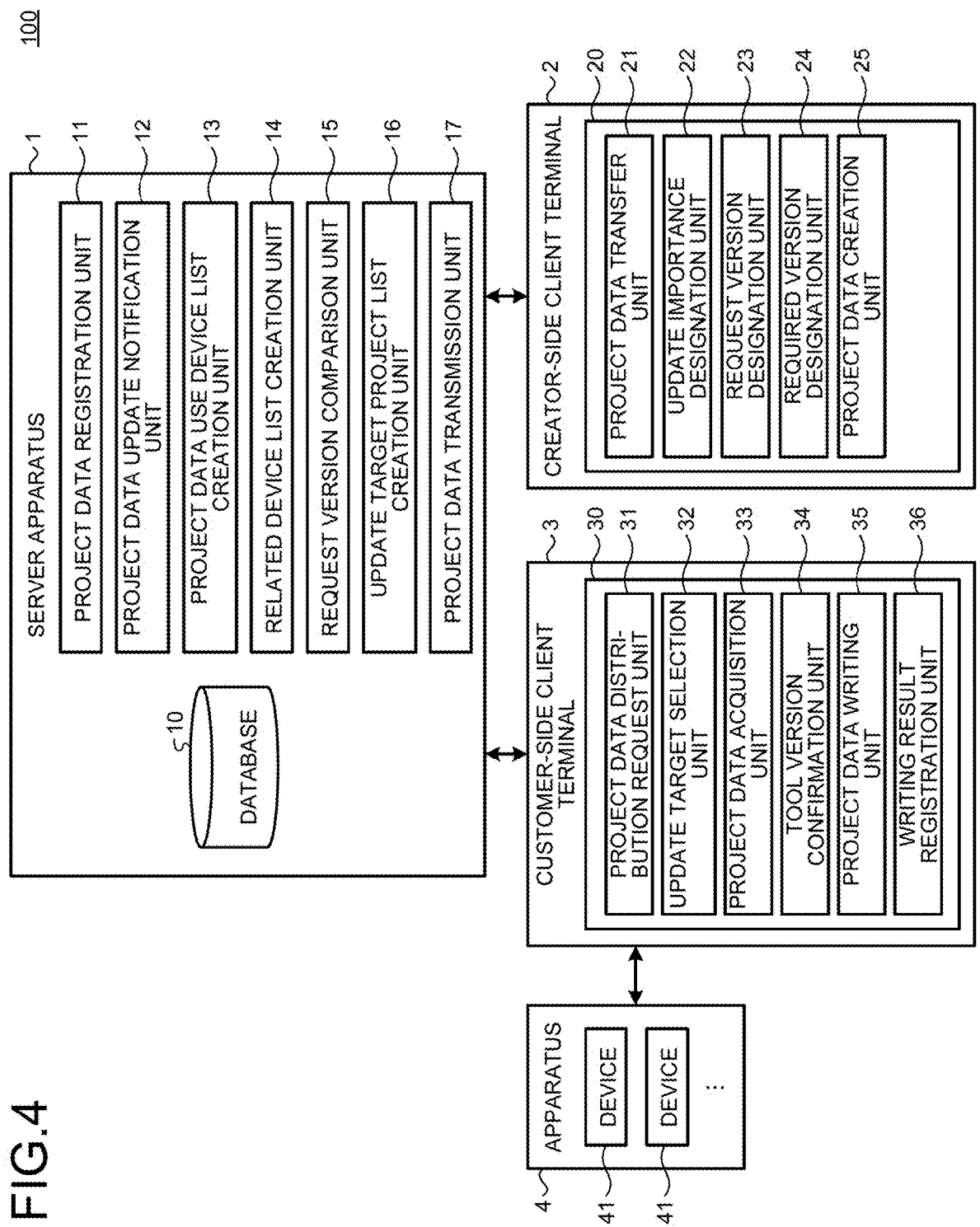
FIG. 4 is a diagram illustrating an exemplary functional block configuration of the server apparatus, the creator-side client terminal, and the customer-side client terminal constituting the data distribution system.

FIG. 4 is a diagram illustrating an exemplary functional block configuration of the server apparatus 1, the creator-side client terminal 2, and the customer-side client terminal 3 constituting the data distribution system 100. The apparatus 4 described above is connected to the customer-side client terminal 3. The apparatus 4 includes a plurality of FA devices 41 shown as "DEVICE" in FIG. 4.

The server apparatus 1 includes the above-described database 10, a project data registration unit 11, a project data update notification unit 12, a project data use device list creation unit 13, a related device list creation unit 14, a request version comparison unit 15, an update target project list creation unit 16, and a project data transmission unit 17.

The project data registration unit 11 acquires the project data and project-related information created by the creator-side client terminal 2 from the creator-side client terminal 2, and registers the project data and project-related information in the database 10.

When new project data is registered in the database 10, the project data update notification unit 12 notifies the customer-side client terminal 3 of each customer, who owns the FA device 41 in which the registered project data is used, that the project data for use has been updated.

When the project data use device list creation unit 13 receives a distribution request for project data from the customer-side client terminal 3, the project data use device list creation unit 13 creates a list of the FA devices 41 in which the requested project data is used. The project data use device list creation unit 13 transmits the created list to the customer-side client terminal 3.

The related device list creation unit 14 is a related device identification unit. In response to being notified by the customer-side client terminal 3 of the result of selecting the FA device 41 to be updated with the project data, the related device list creation unit 14 identifies other FA devices 41 related to the selected FA device 41, and creates a list of the identified FA devices 41. Hereinafter, a list created by the related device list creation unit 14 is referred to as a related device list. The FA devices 41 included in the related device list are referred to as the related FA devices. The related FA devices are other FA devices 41 constituting one apparatus 4 together with the selected FA device 41. For example, in the apparatus 4 having the configuration illustrated in FIG. 2, if the FA device 41A is selected as the target for updating the project data, the FA devices 41B and 41C correspond to the related FA devices. That is, the related device list creation unit 14 creates a list of the FA devices 41 that are not selected as the target for updating the project data among the FA devices 41 constituting one apparatus 4, and sets the list as a related device list.

The request version comparison unit 15 is an update target related device identification unit. The request version comparison unit 15 compares the version of the project data written in each of the related FA devices included in the related device list with the request version indicated by the project-related information of the project data to be updated. Specifically, the request version comparison unit 15 confirms whether the version of the project data written in each of the related FA devices included in the related device list satisfies the request version. The request version is a version guaranteed to be used in combination with the project data to be updated. If the version of the project data does not satisfy the request version, that is, if the two versions compared are different, the request version comparison unit 15 determines that it is necessary to update the project data of the related FA devices.

The update target project list creation unit 16 registers, as update target project data, in the list, the project data of the related FA devices for which the update of the project data is determined to be necessary by the request version comparison unit 15. Hereinafter, a list created by the update target project list creation unit 16 is referred to as an update target project list.

The project data transmission unit 17 transmits the project data registered in the update target project list to the customer-side client terminal 3.

The creator-side client terminal 2 includes a project data transfer unit 21, an update importance designation unit 22, a request version designation unit 23, a required version designation unit 24, and a project data creation unit 25. These units are implemented by an engineering tool 20 installed in the computer operating as the creator-side client terminal 2.

The project data transfer unit 21 receives, from a user who is a creator, the designation of the project data to be uploaded to the server apparatus 1 from among one or more pieces of project data held by the creator-side client terminal 2, and transfers the designated project data and project-related information to the server apparatus 1.

The update importance designation unit 22 receives, from the user, the designation of the importance of update of the project data designated through the project data transfer unit 21, that is, the project data to be uploaded to the server apparatus 1. The importance whose designation received by the update importance designation unit 22 is one of the pieces of information included in the above-described project-related information.

The request version designation unit 23 receives, from the user, the designation of the request version, i.e. the version requested of the project data (hereinafter referred to as the related project data) related to the project data to be uploaded to the server apparatus 1. The related project data is the project data of other FA devices 41 constituting one apparatus 4 together with the FA device 41 to which the project data to be uploaded to the server apparatus 1 is written. Upon receiving the designation of the request version from the user, the request version designation unit 23 generates information having the configuration illustrated in FIG. 5, for example. FIG. 5 is a diagram for explaining the operation of the request version designation unit 23. FIG. 5 shows that the project data to be uploaded to the server apparatus 1 has project ID=1001 and project version=3, and the related project data for this project data are the "project data with project ID=1002 and request version=2" and the "project data with project ID=1003 and request version=2". As the request version, for example, the version of other project data used in combination when verifying the project data to be uploaded to the server apparatus 1 is designated. For example, suppose that one apparatus 4 includes three FA devices 41, the project data of the first FA device 41 is project data A, the project data of the second FA device 41 is project data B, and the project data of the third FA device 41 is project data C. In this case, suppose that project data A of version=3 has been newly created by editing project data A. In addition, suppose that new project data A has been confirmed to work normally through operation verification in combination with "project data B of version=2" and "project data C of version=1". In this case, "project data A of version=3" is to be uploaded to the server apparatus 1, and version=2 and version=1 are designated by the user respectively as the request version of project data B and the request version of project data C. Note that the request version can be freely determined by the user, and thus the version used in the operation verification is not necessarily designated. The request version whose designation received by the request version designation unit 23 is one of the pieces of information included in the above-described project-related information.

The required version designation unit 24 receives, from the user, the designation of the required version of the engineering tool to be used for writing the project data to be uploaded to the server apparatus 1 to the FA device 41. As the required version, for example, the version of the engineering tool used in the creation of the project data to be uploaded to the server apparatus 1 or a newer version is designated. Note that the required version can be freely determined by the user, and thus these versions are not necessarily designated. The required version whose designation received by the required version designation unit 24 is one of the pieces of information included in the above-described project-related information.

The project data creation unit 25 creates project data according to the operation of creating project data by the user. The project data creation unit 25 is also used when project data is changed.

The customer-side client terminal 3 includes a project data distribution request unit 31, an update target selection unit 32, a project data acquisition unit 33, a tool version confirmation unit 34, a project data writing unit 35, and a writing result registration unit 36. These units are implemented by an engineering tool 30 installed in the computer operating as the customer-side client terminal 3.

The project data distribution request unit 31 receives a notification from the server apparatus 1 indicating that a new version of the project data corresponding to the FA device 41 owned by the customer has been registered, and transmits a distribution request for the newly registered project data to the server apparatus 1 when the customer requests the update of the noticed project data.

There may be a plurality of FA devices 41 to which updated project data is available, in which case the update target selection unit 32 receives the selection of the FA device 41 to be the updated from a user.

The project data acquisition unit 33 acquires the project data to be updated from the server apparatus 1.

Before writing the project data acquired from the server apparatus 1 to the FA device 41, the tool version confirmation unit 34 confirms whether the version of the engineering tool 30 used by the customer-side client terminal 3 is appropriate. If the version of the engineering tool 30 is not appropriate, the customer-side client terminal 3 updates the engineering tool 30.

The project data writing unit 35 writes the project data acquired from the server apparatus 1 to the FA device 41.

Once the writing of the project data to the FA device 41 is completed, the writing result registration unit 36 registers information of the FA device 41 to which the project data has been written in the database 10 of the server apparatus 1 as a project data writing result.

Figure 6:
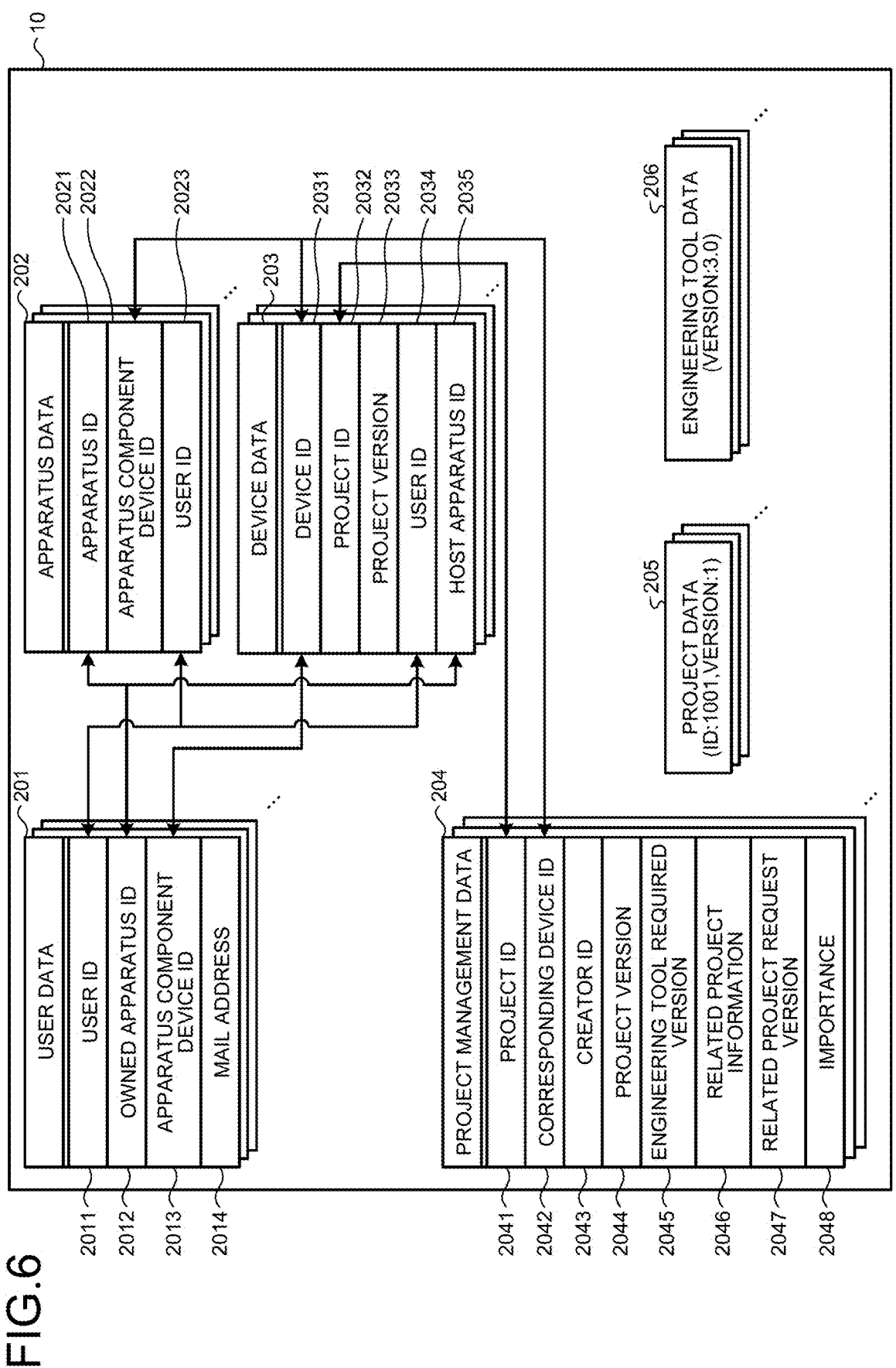
FIG. 6 is a diagram illustrating an example of data registered in the database of the server apparatus.

FIG. 6 is a diagram illustrating an example of data registered in the database 10 of the server apparatus 1. As illustrated in FIG. 6, one or more pieces of user data 201, apparatus data 202, device data 203, project management data 204, project data 205, and engineering tool data 206 are registered in the database 10.

The user data 201 is data related to a user who uses the project data 205, and includes a user ID 2011, an owned apparatus ID 2012, an apparatus component device ID 2013, and a mail address 2014.

The user ID 2011 is identification information of the user. The owned apparatus ID 2012 is identification information of the apparatus 4 owned by the user with the user ID 2011. A plurality of owned apparatus IDs 2012 may be included in one piece of user data 201. The apparatus component device ID 2013 is identification information of the FA device 41 constituting the apparatus 4 with the owned apparatus ID 2012. A plurality of apparatus component device IDs 2013 may be included in one piece of user data 201. The mail address 2014 is an example of contact information of the user with the user ID 2011. The contact information of the user may be information other than the mail address.

The apparatus data 202 is data related to the apparatus 4, and includes an apparatus ID 2021, an apparatus component device ID 2022, and a user ID 2023.

The apparatus component device ID 2022 is identification information of the FA device 41 constituting the apparatus 4 with the apparatus ID 2021. A plurality of apparatus component device IDs 2022 may be included in one piece of apparatus data 202. The apparatus component device ID 2022 is identification information of the user who owns the apparatus 4 with the apparatus ID 2021.

The device data 203 is data related to the FA device 41, and includes a device ID 2031, a project ID 2032, a project version 2033, a user ID 2034, and a host apparatus ID 2035.

The project ID 2032 is identification information of the project data written in the FA device 41 with the device ID 2031. The project version 2033 indicates the version of the project data with the project ID 2032. The user ID 2034 is identification information of the user who owns the FA device 41 with the device ID 2031. The host apparatus ID 2035 is identification information of the apparatus 4 to which the FA device 41 with the device ID 2031 belongs, that is, the apparatus 4 including the FA device 41.

The project management data 204 is data related to project data, and includes a project ID 2041, a corresponding device ID 2042, a creator ID 2043, a project version 2044, an engineering tool required version 2045, related project information 2046, a related project request version 2047, and an importance 2048.

The project ID 2041 is identification information of the project data. The corresponding device ID 2042 is identification information of the FA device 41 in which the project data with the project ID 2041 is written. The corresponding device ID 2042 is updated when the project data with the project ID 2041 is written to the FA device 41. The creator ID 2043 is identification information of the creator of the project data with the project ID 2041. The project version 2044 indicates the version of the project data with the project ID 2041. The engineering tool required version 2045 indicates the version of the engineering tool to be used when the project data with the project ID 2041 is written to the FA device 41. The related project information 2046 is information indicating related project data for the project data with the project ID 2041. The related project information 2046 is the project ID of the related project data. Other project data related to the project data with the project ID 2041 is project data written in each of the other FA devices 41 constituting one apparatus 4 together with the FA device 41 in which the project data with the project ID 2041 is written. The related project request version 2047 is a version requested of each piece of project data indicated by the related project information 2046. The importance 2048 indicates the importance of update to the project data with the project ID 2041.

The project data 205 is project data created and edited by the creator-side client terminal 2, and is written to the FA device 41 via the customer-side client terminal 3 in response to a request from the customer-side client terminal 3. The project data 205 includes information such as the project ID and the version in addition to the data body. Note that the example illustrated in FIG. 6, in which the project management data 204 and the project data 205 are separately registered in the database 10, may be replaced with a configuration in which the project data 205 includes the project management data 204. The project data 205 may be registered in the database 10 with the project management data 204 attached thereto.

In response to a request from the creator-side client terminal 2 or the customer-side client terminal 3, the engineering tool data 206 is transmitted to the requester client terminal (creator-side client terminal 2 or customer-side client terminal 3) and installed in the requester client terminal.

The user data 201, the apparatus data 202, the device data 203, and the project management data 204 are associated with each other through one or more pieces of information included therein. In FIG. 6, correspondence relationships of information are indicated by arrows: for example, the user ID 2011, the user ID 2023, and the user ID 2034 associate the user data 201, the apparatus data 202, and the device data 203. The owned apparatus ID 2012 and the apparatus ID 2021 associate the user data 201 and the apparatus data 202. The project ID 2032 and the project ID 2041 associate the device data 203 and the project management data 204.

Note that in FIG. 4, the functions of the creator-side client terminal 2 and the functions of the customer-side client terminal 3 appear to be different, but this is for the convenience of description, and these two terminals have similar functions. In FIG. 4, the configuration of the functions used by the creator of the project data is depicted for the creator-side client terminal 2, and the configuration of the functions used by the customer who uses the project data is depicted for the customer-side client terminal 3.

Figure 7:
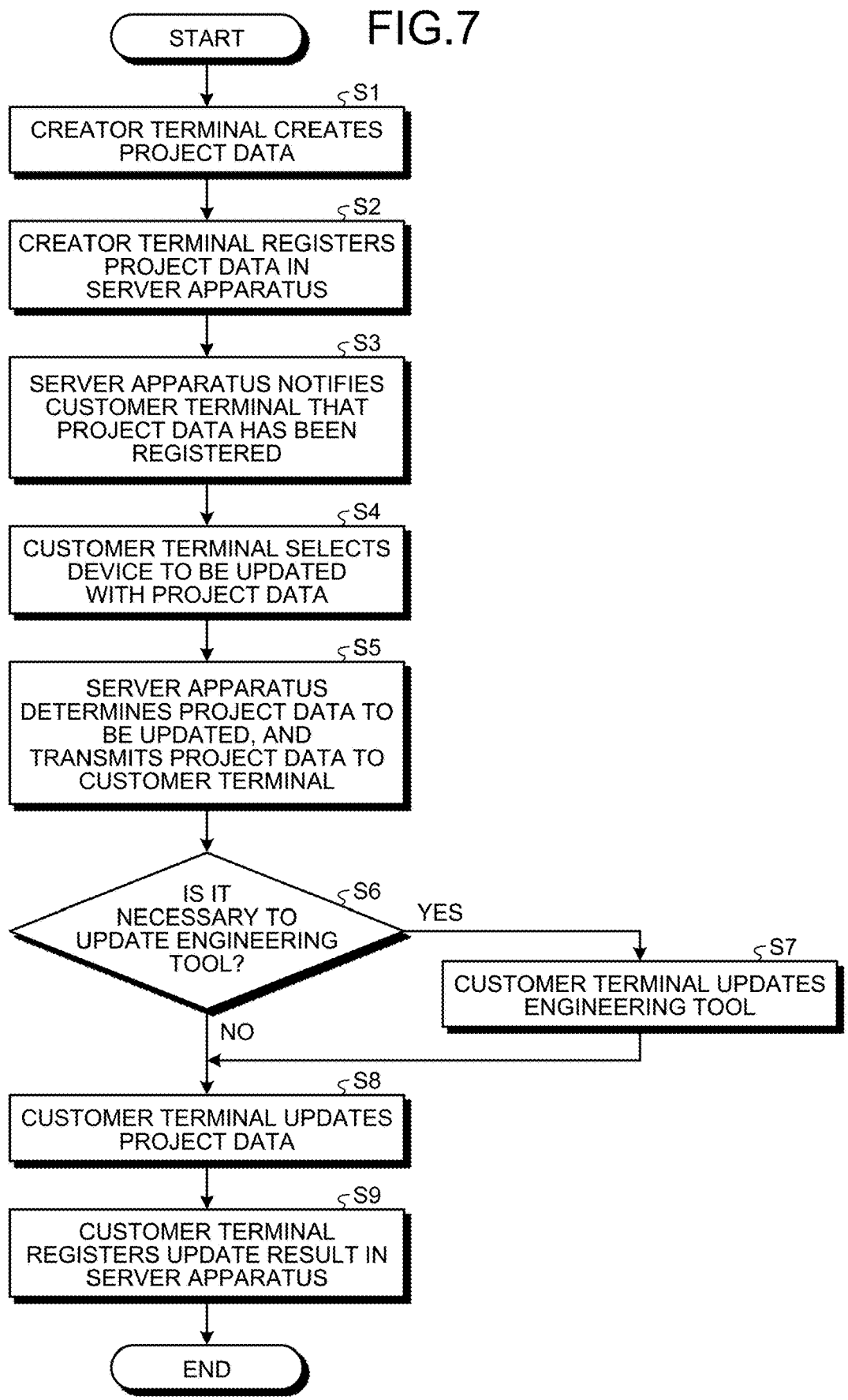
FIG. 7 is a flowchart illustrating an example of the operation of the data distribution system.

Next, the operation of the entire data distribution system 100 will be described with reference to drawings. FIG. 7 is a flowchart illustrating an example of the operation of the data distribution system 100. The flowchart of FIG. 7 illustrates the operation in which the creator-side client terminal 2 creates project data and uploads the project data to the server apparatus 1, and the customer-side client terminal 3 downloads the project data from the server apparatus 1 and writes the project data to the FA device 41 of the apparatus 4. Note that the term "DEVICE" in FIG. 7 means "FA device". In addition, the term "CREATOR TERMINAL" means "creator-side client terminal", and the term "CUSTOMER TERMINAL" means "customer-side client terminal".

In the data distribution system 100, first, the creator-side client terminal 2 creates project data (step S1). This example is based on the assumption that existing project data is edited into a new version of project data. The project data is created by the project data creation unit 25.

Next, the creator-side client terminal 2 registers the project data created in step S1 in the server apparatus 1 (step S2).

In this step S2, the project data transfer unit 21 receives, from the user, the designation of the project data created in step S1 as the project data to be transferred to the server apparatus 1, and the update importance designation unit 22 receives, from the user, the designation of the importance of update of the project data to be transferred. Further, the request version designation unit 23 receives, from the user, the designation of the request version for the related project data for the project data to be transferred. In addition, the required version designation unit 24 receives, from the user, the designation of the required version of the engineering tool to be used for writing the designated project data to the FA device 41. The project data transfer unit 21 adds, to the project data designated by the user, the importance designated by the user through the update importance designation unit 22, the request version for the related project data designated by the user through the request version designation unit 23, and the required version of the engineering tool designated by the user through the required version designation unit 24, and transmits the project data to the server apparatus 1.

The server apparatus 1 that has received the project data from the creator-side client terminal 2 registers the project data in the database 10. Specifically, the project data registration unit 11 registers the received project data in the database 10 as the project data 205, and registers the information added to the received project data in the database 10 as the project management data 204.

Next, the server apparatus 1 notifies the customer-side client terminal 3 that the project data has been newly registered in the database 10 (step S3). In this case, the server apparatus 1 gives notification of information related to the newly registered project data to the customer-side client terminal 3 of the user who owns the FA device 41 in which the project data newly registered in the database 10 is used. Below is a detailed description of this operation.

In step S3, the project data update notification unit 12 confirms the user data 201 and the device data 203 registered in the database 10, creates a correspondence list of project IDs and user IDs as illustrated in FIG. 8, for example, and identifies the user ID of a target user to be notified. Next, the project data update notification unit 12 creates a correspondence list of user IDs and contacts, namely mail addresses, of notification target users as illustrated in FIG. 9, and transmits a mail indicating that the project data has been newly registered in the database 10 to each mail address included in the list. This mail also provides the importance of update of the registered project data. The user of the customer-side client terminal 3 who has received the notification determines whether to perform an update to the project data, and requests the update via the customer-side client terminal 3 in response to determining to perform the update. That is, the project data distribution request unit 31 transmits a distribution request for the project data to the server apparatus 1. In the server apparatus 1 that has received the distribution request, the project data use device list creation unit 13 refers to the device data 203 in the database 10, creates a list of the FA devices 41 in which an older version of the project data than that of the project data which is newly registered in the database 10 is used, and transmits the list to the customer-side client terminal 3 as a project use device list.

Returning to FIG. 7, next, the customer-side client terminal 3 that has received the project use device list selects the FA device 41 to be updated with the project data from among the FA devices 41 included in the project use device list (step S4). This selection is performed by the user who uses the customer-side client terminal 3. That is, in step S4, the customer-side client terminal 3 receives, from the user, the selection of the FA device 41 to be updated with the project data.

Specifically, the update target selection unit 32 displays the project use device list on a display unit (not illustrated in FIG. 4), and receives the selection of the FA device 41 to be updated with the project data from the user. The update target selection unit 32 creates a list of the selected FA devices 41, and transmits the list to the server apparatus 1 as an update target device list.

Upon receiving the update target device list, the server apparatus 1 determines the project data to be updated based on the update target device list and transmits the project data to the customer-side client terminal 3 (step S5).

Figures 10, 11:
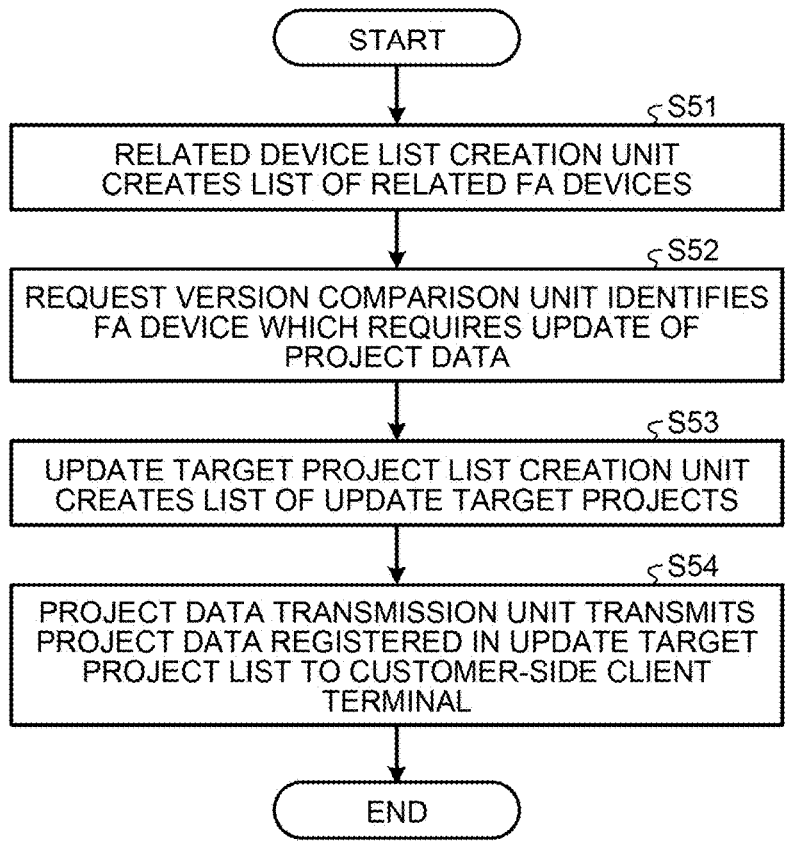
FIG. 10 is a flowchart illustrating an example of the operation in which the server apparatus determines the project data to be updated and transmits the project data to the customer-side client terminal.
FIG. 11 is a diagram illustrating an example of a related device list.

The operation of step S5 illustrated in FIG. 7 will be described in detail with reference to FIG. 10. FIG. 10 is a flowchart illustrating an example of the operation in which the server apparatus 1 determines the project data to be updated and transmits the project data to the customer-side client terminal 3.

In step S5 illustrated in FIG. 7, as illustrated in FIG. 10, the related device list creation unit 14 first searches the database 10 to create a list of all related FA devices for all the FA devices 41 included in the update target device list (step S51). This list is referred to as the related device list. For example, the related device list creation unit 14 creates the related device list as illustrated in FIG. 11 by extracting information satisfying the conditions from the list of the version information of the project data used by each FA device 41 constituting each apparatus 4. FIG. 11 is a diagram illustrating an example of the related device list.

Figure 12:
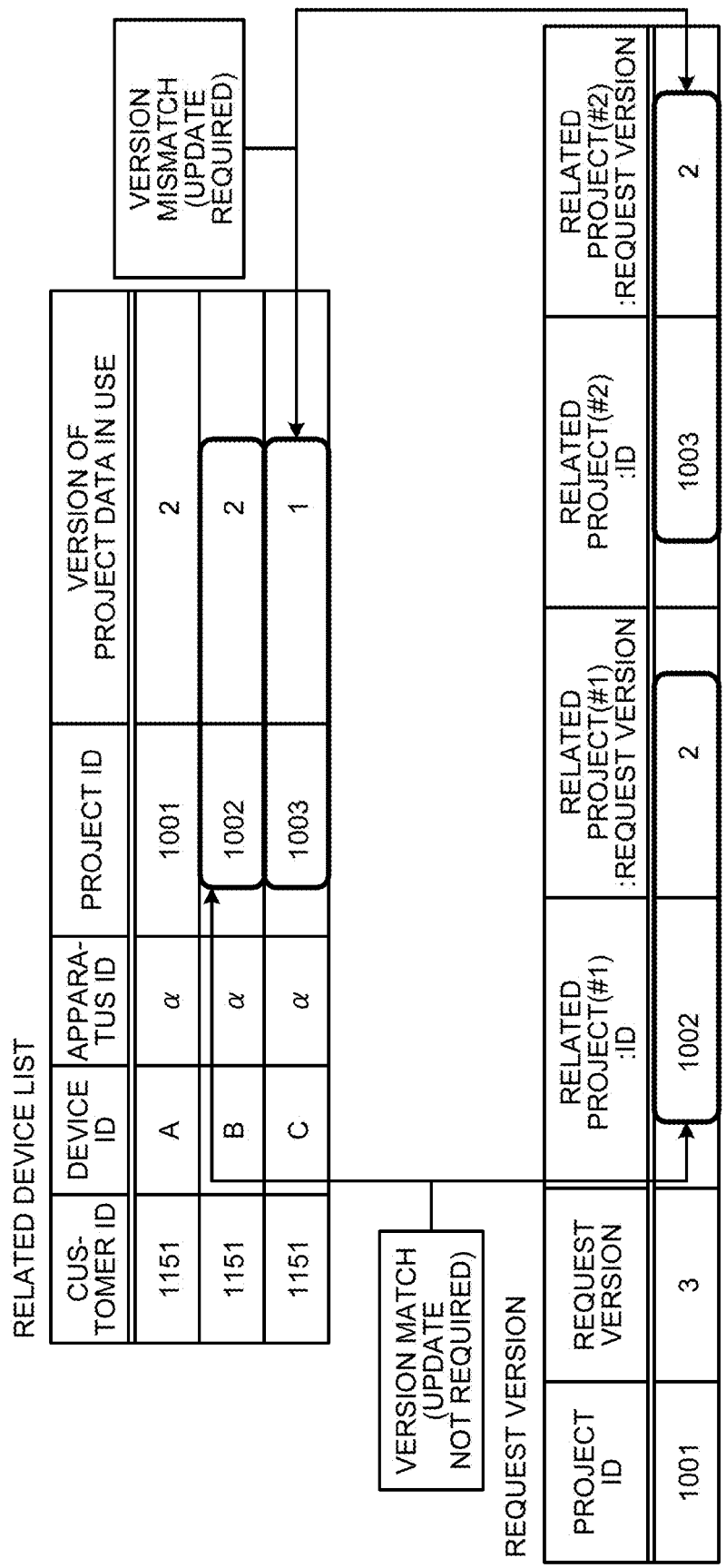
FIG. 12 is a diagram for explaining the operation of the request version comparison unit of the server apparatus.

Next, the request version comparison unit 15 compares the version of the project data of each FA device 41 registered in the related device list with the request version (related project request version 2047) of the related project data for the project data registered in the database 10 in step S2 described above, thereby identifying the FA device 41 which requires the update of the project data (step S52). FIG. 12 is a diagram for explaining the operation of the request version comparison unit 15 of the server apparatus 1. For example, as illustrated in FIG. 12, the request version comparison unit 15 confirms whether the version of the project data used by the FA device 41 included in the related device list matches the request version. In the case of the example illustrated in FIG. 12, since the version of the project data with project ID=1002 matches the request version, the request version comparison unit 15 determines that it is not necessary to update the project data. On the other hand, since the version of the project data with project ID=1003 does not match the request version, the request version comparison unit 15 determines that it is necessary to update the project data.

Next, the update target project list creation unit 16 creates a list of update target projects, which are the project data determined to require update by the request version comparison unit 15 (step S53). Hereinafter, a list created by the update target project list creation unit 16 is referred to as an update target project list. After the creation of the update target project list by the update target project list creation unit 16 is completed, the project data transmission unit 17 transmits each piece of project data registered in the update target project list to the customer-side client terminal 3 (step S54). In this case, the project data transmission unit 17 adds the engineering tool required version 2045 included in the project management data 204 illustrated in FIG. 6 to the project data to be transmitted. The engineering tool required version 2045 added to the project data is the engineering tool required version 2045 of the project management data 204 corresponding to the project data registered in the database 10 in step S2 described above.

Returning to FIG. 7, in the customer-side client terminal 3, the project data acquisition unit 33 receives the project data transmitted by the server apparatus 1 in step S5. The customer-side client terminal 3 that has received the project data from the server apparatus 1 confirms whether it is necessary to update the engineering tool (step S6). In step S6, the tool version confirmation unit 34 compares the version of the engineering tool indicated by the engineering tool required version 2045 added to the received project data with the version of the engineering tool 30 used by the customer-side client terminal 3. In response to confirming that these two versions are different, the tool version confirmation unit 34 determines that it is necessary to update the engineering tool.

Figures 13, 14:
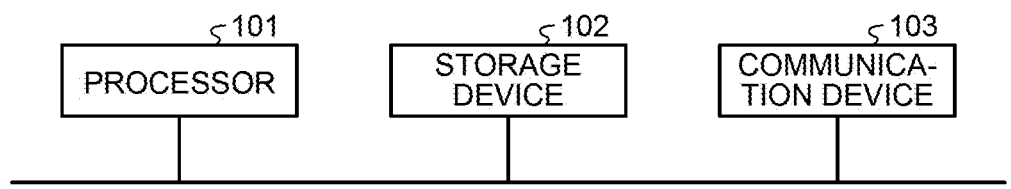
FIG. 13 is a diagram illustrating an example correspondence relationship between the version of project data and the required version of the engineering tool.
FIG. 14 is a diagram illustrating an example of hardware for implementing the server apparatus.

FIG. 13 is a diagram illustrating an example correspondence relationship between the version of project data and the required version of the engineering tool. As illustrated in FIG. 13, if the required version of the engineering tool for writing the project data with project ID=1001 to the FA device 41 is "1.1" for the project versions "1" and "2" and "1.2" for the project version "3", updating the project data with project ID=1001 of the FA device 41 from "2" to "3" causes the required version of the engineering tool to change from "1.1" to "1.2". In this case, it may be necessary to update the engineering tool. Note that in a case where a plurality of FA devices 41 constituting the apparatus 4 are project data update targets, the tool version confirmation unit 34 compares the required version for each piece of project data written in the plurality of update target FA devices 41 with the version of the engineering tool 30 used by the customer-side client terminal 3, and determines whether it is necessary to update the engineering tool.

If it is necessary to update the engineering tool (step S6: Yes), the customer-side client terminal 3 updates the engineering tool to be used (step S7). In step S7, the customer-side client terminal 3 downloads and installs, from the database 10 of the server apparatus 1, the engineering tool data 206 of the version indicated by the engineering tool required version 2045 added to the received project data, and updates the engineering tool 30.

If it is not necessary to update the engineering tool (step S6: No) or after the update of the engineering tool in step S7 is completed, the customer-side client terminal 3 writes the project data received from the server apparatus 1 to the corresponding FA device 41 and updates the project data (step S8). Specifically, the project data writing unit 35 writes each piece of project data received by the project data acquisition unit 33 to the corresponding FA device 41.

After the writing of the project data to the FA device 41 is completed, the customer-side client terminal 3 registers the update result of the project data in the server apparatus 1 (step S9). Specifically, the writing result registration unit 36 transmits the update result of the project data to the server apparatus 1, and the server apparatus 1 that has received the update result registers the update result in the database 10. The registration of the update result in the database 10 may be performed by another functional unit not illustrated in FIG. 4, or by the illustrated project data registration unit 11, for example. The following description is based on the premise that the project data registration unit 11 performs the registration in the database 10. The update result of the project data includes at least information on the FA device 41 having the project data updated and the version information of the updated project data. In the server apparatus 1, the project data registration unit 11 updates the project version 2033 of the device data 203 illustrated in FIG. 6 according to the content of the received update result. That is, the project data registration unit 11 rewrites the value of the project version 2033 of the device data 203, in which the device ID of the FA device 41 having the project data updated is registered, to the version of the updated project data.

Note that although the present embodiment has described the procedure in which the customer-side client terminal 3 makes a distribution request for project data after receiving a notification indicating that new project data has been registered in the database 10 of the server apparatus 1, this is an example. The customer-side client terminal 3 can make a distribution request for project data at any timing.

Subsequently, the hardware configuration of the server apparatus 1 will be described. FIG. 14 is a diagram illustrating an example of hardware for implementing the server apparatus 1.

The server apparatus 1 can be implemented by a processor 101, a storage device 102, and a communication device 103. The processor 101 is exemplified by a central processing unit (CPU, also referred to as a central processing device, a processing device, a computation device, a microprocessor, a microcomputer, or a digital signal processor (DSP)), or a system large scale integration (LSI). The storage device 102 is a random access memory (RAM), a read only memory (ROM), a hard disk drive, a solid state drive (SSD), a removable memory device, or a combination thereof.

The project data registration unit 11, the project data update notification unit 12, the project data use device list creation unit 13, the related device list creation unit 14, the request version comparison unit 15, and the update target project list creation unit 16 of the server apparatus 1 are implemented by the processor 101 executing a data distribution program that is a program for operating as these units. The data distribution program for operating as the project data registration unit 11, the project data update notification unit 12, the project data use device list creation unit 13, the related device list creation unit 14, the request version comparison unit 15, and the update target project list creation unit 16 is stored in advance in the storage device 102. The processor 101 reads and executes the data distribution program from the storage device 102, thereby operating as the project data registration unit 11, the project data update notification unit 12, the project data use device list creation unit 13, the related device list creation unit 14, the request version comparison unit 15, and the update target project list creation unit 16.

The project data transmission unit 17 of the server apparatus 1 is implemented by the communication device 103. The database 10 is implemented by the storage device 102.

The processor 101, the storage device 102, and the communication device 103 illustrated in FIG. 14 may be hardware constituting an electronic computer. That is, the server apparatus 1 may be implemented by an electronic computer and the data distribution program that is executed by the electronic computer.

Note that the data distribution program for operating as the respective units of the server apparatus 1 may not necessarily be stored in advance in the storage device 102. The data distribution program may be written in a recording medium such as a compact disc (CD)-ROM or a digital versatile disc (DVD)-ROM for supply to the user so as to be installed in the storage device 102 by the user. Alternatively, the data distribution program may be provided to the user via a network such as the Internet.

Although the above-described hardware configuration is designed for the server apparatus 1, the creator-side client terminal 2 and the customer-side client terminal 3 can also be implemented by hardware similar to the hardware for implementing the server apparatus 1. The creator-side client terminal 2 and the customer-side client terminal 3 are implemented by installing, to the storage device 102, a program for operating as an engineering tool having the function of each processing unit described above, and executing the program by the processor 101.

As described above, in the data distribution system 100 according to the present embodiment, the server apparatus 1 receives a distribution request for the project data of the FA device 41, then identifies the related FA devices for the FA device 41 in which the requested project data is used, further confirms whether any of the related FA devices requires the update of the project data, and in response to confirming that some related FA device requires the update of the project data, transmits the project data that needs to be written to the related FA device to the customer-side client terminal 3 together with the requested project data to be written to the FA device 41. The customer-side client terminal 3 writes each piece of project data received from the server apparatus 1 to the corresponding FA device 41. According to the data distribution system 100, when the project data of the FA device 41 selected by the customer is updated, the version of the project data of the other FA devices 41 constituting the same apparatus 4 can be reliably changed to the version guaranteed to be used in combination with the project data of the selected FA device 41, and the operation of the apparatus 4 can be prevented from becoming unstable due to the update of the project data of the FA device 41.

In addition, according to the data distribution system 100, the following problems can be solved. Consider a possible case in which before project data is transferred to the FA device, the engineering tool is used for visually confirming details of the project data to be transferred, for example, changed portions. In this case, however, the confirmation of the project data may not be possible if the software version of the engineering tool used in the change work of the project data in the creator-side client terminal 2 is different from that of the engineering tool to be used by the customer-side client terminal 3 that transfers the project data to the FA device. It is also possible that the transfer of the project data to the FA device cannot be successfully performed. For example, if the version of the engineering tool to be used by the customer-side client terminal 3 is older than the version of the engineering tool used by the creator-side client terminal 2 in the change work of the project data, the engineering tool of the older version may recognize the project data created by the engineering tool of the newer version as unknown data, resulting in restrictions on content confirmation and transfer. However, in the data distribution system 100, as described above, the customer-side client terminal 3 confirms the necessity of updating the engineering tool, and if necessary, first updates the engineering tool and then transfers the project data to the destination FA device using the updated engineering tool. Therefore, it is possible to prevent the content confirmation and transfer of the project data from being restricted.

The present embodiment has described the operation for updating the project data of the FA device 41 to a new version, but the present embodiment can also be applied for restoring the project to an older version used in the past. For example, the customer-side client terminal 3 acquires the list of project data registered in the database 10 of the server apparatus 1, and the customer selects the project data of the version to restore. Then, the server apparatus 1 confirms whether the project data of the version guaranteed to be used in combination with the selected project data is used in other FA devices 41. In response to confirming that the project data of the version guaranteed to be used in combination with the selected project data is not used in other FA devices 41 (related FA devices), the server apparatus 1 transmits the project data of the guaranteed version to the customer-side client terminal 3, and the customer-side client terminal 3 restores the project data in the related FA devices. This is effective for restoring the project data of a certain FA device 41 for some reason such as unstable operation of the apparatus 4, because it is possible to ensure that the versions of the project data that the FA devices 41 of the apparatus 4 use after restoration are correctly combined, and to reliably return the apparatus 4 to the proven stable operation.

The configurations described in the above-mentioned embodiment indicate examples. The configurations can be combined with another well-known technique, and some of the configurations can be omitted or changed in a range not departing from the gist.

REFERENCE SIGNS LIST 1 server apparatus; 2 creator-side client terminal; 3 customer-side client terminal; 4 apparatus; 10 database; 11 project data registration unit; 12 project data update notification unit; 13 project data use device list creation unit; 14 related device list creation unit; 15 request version comparison unit; 16 update target project list creation unit; 17 project data transmission unit; 20, 30 engineering tool; 21 project data transfer unit; 22 update importance designation unit; 23 request version designation unit; 24 required version designation unit; 25 project data creation unit; 31 project data distribution request unit; 32 update target selection unit; 33 project data acquisition unit; 34 tool version confirmation unit; 35 project data writing unit; 36 writing result registration unit; 41, 41A, 41B, 41C FA device; 100 data distribution system; 201 user data; 202 apparatus data; 203 device data; 204 project management data; 205 project data; 206 engineering tool data.

The invention claimed is:

1. A non-transitory computer readable medium storing a data distribution program for causing a server apparatus to execute a process of distributing project data to a terminal apparatus that writes the project data to a device among a plurality of devices included in an apparatus, the data distribution program causing the server apparatus to execute process procedures including:
receiving a distribution request for the project data from the terminal apparatus;
identifying a related device that is another device constituting one apparatus together with the device to which the project data designated in the distribution request is written;
identifying the related device that requires update of project data based on a request version that is a version requested of project data related to the project data designated in the distribution request, and a version of the project data written in the related device; and
transmitting, to the terminal apparatus, the project data designated in the distribution request and the project data to be written to the related device identified.

2. The non-transitory computer readable medium storing the data distribution program according to claim 1, wherein
the project data includes information of the request version, and
in the identifying, the related device in which a version of the project data written in the related device is different from the request version is determined as the related device that requires update of project data.

3. The non-transitory computer readable medium storing the data distribution program according to claim 1, comprising:
acquiring new project data and registering the new project data in a database; and
notifying the terminal apparatus of information related to the project data registered in the database.

4. The non-transitory computer readable medium storing the data distribution program according to claim 3, wherein
an importance of update of the project data is set in the project data acquired, and
the information which the terminal apparatus is notified of includes the importance set in the project data registered in the database.

5. The non-transitory computer readable medium storing the data distribution program according to claim 2, comprising:
acquiring new project data and registering the new project data in a database; and
notifying the terminal apparatus of information related to the project data registered in the database.

6. The non-transitory computer readable medium storing the data distribution program according to claim 5, wherein
an importance of update of the project data is set in the project data acquired, and
the information which the terminal apparatus is notified of includes the importance set in the project data registered in the database.

7. A server apparatus that distributes project data to a terminal apparatus that writes the project data to a device among a plurality of devices included in an apparatus, the server apparatus comprising:
a database to which the project data and information related to the project data are written;
related device identification circuitry to identify, in response to receiving a distribution request for the project data from the terminal apparatus, a related device that is another device constituting one apparatus together with the device to which the project data designated in the distribution request is written;
update target related device identification circuitry to identify the related device that requires update of project data based on a request version that is a version requested of project data related to the project data designated in the distribution request and a version of the project data written in the related device; and
project data transmission circuitry to transmit, to the terminal apparatus, the project data designated in the distribution request and the project data to be written to the related device identified by the update target related device identification circuitry.

8. A terminal apparatus connected to the server apparatus according to claim 7, the terminal apparatus constituting a data distribution system together with the server apparatus according to claim 7, the terminal apparatus comprising:

project data acquisition circuitry to acquire the project data from the server apparatus;

project data writing circuitry to write the project data acquired by the project data acquisition circuitry to the device using an engineering tool; and tool version confirmation circuitry to confirm whether a version of the engineering tool to be used for writing the project data acquired by the project data acquisition circuitry to the device is appropriate.

9. The terminal apparatus according to claim 8, wherein the project data acquired by the project data acquisition circuitry includes information on a version of the engineering tool available for writing project data, and when the version indicated by the information included in the project data acquired by the project data acquisition circuitry is different from the version of the engineering tool used by the project data writing circuitry, the tool version confirmation circuitry determines that it is necessary to update the engineering tool used by the project data writing circuitry.

10. A data distribution system comprising:

a server apparatus to hold project data to be written to a device among a plurality of devices included in an apparatus; and a terminal apparatus to acquire the project data from the server apparatus and write the project data to the device, wherein the server apparatus includes:

a database to which the project data and information related to the project data are written;

related device identification circuitry to identify, in response to receiving a distribution request for the project data from the terminal apparatus, a related device that is another device constituting one apparatus together with the device to which the project data designated in the distribution request is written;

update target related device identification circuitry to identify the related device that requires update of project data based on a request version that is a version requested of project data related to the project data designated in the distribution request and a version of the project data written in the related device; and project data transmission circuitry to transmit, to the terminal apparatus, the project data designated in the distribution request and the project data to be written to the related device identified by the update target related device identification circuitry, and the terminal apparatus includes:

project data acquisition circuitry to transmit the distribution request to the server apparatus and acquire the project data from the server apparatus;

project data writing circuitry to write the project data acquired by the project data acquisition circuitry to the device using an engineering tool; and tool version confirmation circuitry to confirm whether a version of the engineering tool to be used for writing the project data acquired by the project data acquisition circuitry to the device is appropriate.

\* \* \* \* \*